United States Patent
Rousseau et al.

(10) Patent No.: US 6,453,101 B1
(45) Date of Patent: Sep. 17, 2002

(54) OPTICAL FIBER USEFUL FOR WAVELENGTH MULTIPLEXING TRANSMISSION SYSTEM

(75) Inventors: Jean-Claude Rousseau, Chatou; Marianne Paillot, Asnieres, both of (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/555,683

(22) PCT Filed: Oct. 5, 1999

(86) PCT No.: PCT/FR99/02373
§ 371 (c)(1),
(2), (4) Date: Jun. 2, 2000

(87) PCT Pub. No.: WO00/20906
PCT Pub. Date: Apr. 13, 2000

(30) Foreign Application Priority Data

Oct. 5, 1998 (FR) ............................................. 98 12432

(51) Int. Cl.[7] ................................................. G02B 6/16
(52) U.S. Cl. ..................... 385/123; 385/124; 385/127; 385/128
(58) Field of Search ............................... 385/123, 124, 385/127, 125, 126, 128

(56) References Cited

U.S. PATENT DOCUMENTS

| | | | |
|---|---|---|---|
| 4,435,040 A | | 3/1984 | Cohen et al. |
| 5,675,690 A | * | 10/1997 | Nouchi et al. .............. 385/127 |
| 5,721,800 A | * | 2/1998 | Kato et al. .................. 385/127 |
| 5,748,824 A | * | 5/1998 | Smith .......................... 385/124 |
| 5,838,867 A | * | 11/1998 | Onishi et al. ................ 385/123 |
| 5,963,700 A | * | 10/1999 | Kato et al. .................. 385/127 |
| 5,999,679 A | * | 12/1999 | Antos et al. ................ 385/127 |
| 6,009,221 A | * | 12/1999 | Tsuda .......................... 385/123 |
| 6,009,222 A | * | 12/1999 | Dong et al. ................. 385/127 |
| 6,072,929 A | * | 6/2000 | Kato et al. .................. 385/123 |
| 6,266,467 B1 | * | 7/2001 | Kato et al. .................. 385/123 |

FOREIGN PATENT DOCUMENTS

| | | |
|---|---|---|
| EP | 0 026 937 A1 | 4/1981 |
| EP | 0 260 795 A2 | 3/1988 |
| EP | 0 626 768 A1 | 11/1994 |
| EP | 0 938 001 A1 | 8/1999 |
| GB | 2 102 146 A | 1/1983 |
| GB | 2 118 321 A | 10/1983 |

OTHER PUBLICATIONS

A. Safaai–Jazi et al, "Evaluation of Chromatic Dispersion in W–Type Fibers", Optics Letters, US Optical Society Of America, Washington, vol. 14, No. 14, pp. 760–762 XP000071123.

* cited by examiner

Primary Examiner—Akm E. Ullah
Assistant Examiner—Jennifer Doan
(74) Attorney, Agent, or Firm—Sughrue Mion, PLLC

(57) ABSTRACT

The invention relates to a dispersion-shifted optical fiber comprising a core and cladding, with an index profile of shape consisting of a rectangular central portion surrounded by an annular portion of index lower than the index of the cladding, and then by the cladding, with a zero chromatic dispersion at a wavelength value $\lambda_o$ lying in the range 1380 nm to 1450 nm, and with chromatic dispersion at 1550 nm lying in the range 8 ps/nm·km to 12 ps/nm·km. The invention also relates to the use of such an optical fiber in a wavelength division multiplexed system.

13 Claims, 1 Drawing Sheet

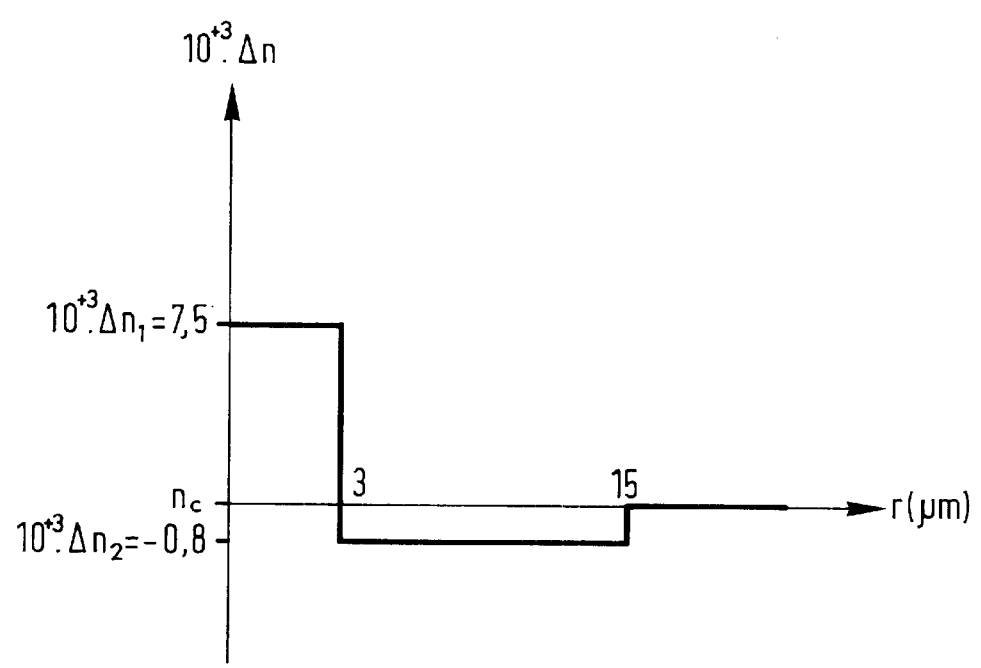

OPTICAL FIBER USEFUL FOR WAVELENGTH MULTIPLEXING TRANSMISSION SYSTEM

BACKGROUND OF THE INVENTION

The present invention relates to the field of optical fibers, and more particularly to the field of dispersion-shifted optical fibers serving for use in wavelength division multiplexed (WDM) transmission systems.

Single-mode optical fibers that are referred to as "dispersion-shifted fibers" (DSFs) are such that, at the transmission wavelength at which they are used (which wavelength is, in general, different from the wavelength of 1.3 μm for which the dispersion of silica is substantially zero), the chromatic dispersion of the transmitted wave is substantially zero; i.e. the non-zero chromatic dispersion of silica is compensated (hence, the use of the term "shifted") by increasing the index difference Δn between the core of the fiber and the optical cladding. This index difference makes it possible to shift the wavelength for which the chromatic dispersion is zero. It is obtained by inserting dopants into the fiber while it is being manufactured, e.g. by a modified chemical vapor deposition (MCVD) process that is known per se, and that is not described in any more detail herein. The terms "cladding" and "core" are known to the person skilled in the art; conventionally, the "cladding" is the portion that extends to a diameter of 125 μm. The core corresponds to the portion in which about 70% of the light energy propagates.

As is well known to the person skilled in the art, DSFs differ in general from conventional stepped-index fibers that are referred to as "non-dispersion-shifted fibers" (NDSFs), and they also differ from "dispersion-flattened fibers" which have low chromatic dispersion over a wavelength range 1310 nm to 1550 nm, and which are such that they generally have two chromatic dispersion zeros in the range in question.

Numerous index profiles have been proposed for such dispersion-shifted single-mode optical fibers. The index profile is generally described by the curve representing the variation in the refractive index as a function of the radius of the fiber. Conventionally, the x-axis gives the distance r to the center of the fiber, and the y-axis gives the refractive index, defined by its difference relative to the index of the cladding of the fiber, in absolute difference (Δn) or in percentage difference (%Δ). The definition of the relative difference between the index $n_1$ and the index $n_c$ of the fiber may be written as follows:

$$\%\Delta = 100 \cdot (n_1^2 - n_c^2)/2n_1^2$$

Given the small differences between the indices, this relative difference is substantially equal to the quantity $(n_1-n_c)/n_c$; it is thus common to use the approximation $\%\Delta = \Delta n/n_c$, where $n_c$ is the refractive index of silica.

The index profile is thus said to be "stepped", "trapezium-shaped" or "triangular" for curves representing the variation of refractive index as a function of radius that are respectively stepped, trapezium-shaped, or triangular. Such curves generally represent the ideal or reference profile of the fiber, the constraints involved in manufacturing the fiber often giving rise to a profile that is significantly different. By way of example, U.S. Pat. No. 5,659,649 shows a reference profile that is trapezium-with-ring shaped, and the different reference profile that is obtained on manufacturing the fiber.

Such single-mode fibers must also preferably have characteristics that correspond to the requirements both of cable-makers and of system designers: firstly, cable-makers look for good "cablability", i.e. they want the fiber to be suitable for being included in a cable without inducing any or much additional attenuation. One solution to that problem consists in reducing the mode diameter of the fiber. Secondly, system-designers, desire large effective area, and a suitable value for the zero-dispersion wavelength $\lambda_0$. In addition, interest has recently arisen for "Non-Zero Dispersion-Shifted Fiber" (NZ-DSF) which is dispersion-shifted fiber in which chromatic dispersion at 1550 nm differs from zero.

Patent U.S. Pat. No. 5,327,516 describes a dispersion-shifted optical fiber in which it is proposed to reduce the non-linear effects by imparting a shallow chromatic dispersion gradient at the wavelengths in question, the value of the chromatic dispersion at said wavelengths generally lying in the range 1 ps/nm·km to 4 ps/nm·km.

Unfortunately, such a fiber still suffers from non-linear effects, such as four-wave mixing, that are considerable. That is why it appears to the applicant that it is desirable to have a dispersion-shifted fiber that minimizes non-linear effects.

SUMMARY OF THE INVENTION

The invention thus proposes a new type of dispersion-shifted fiber advantageously having losses in dB/km that are low, a chromatic dispersion gradient that is shallow, and a chromatic dispersion value at 1550 nm that is sufficiently high. Such a fiber makes it possible to minimize non-linear effects as compared with prior art NZ-DSFs.

More precisely, the invention provides a dispersion-shifted optical fiber comprising a core and cladding, with an index profile of shape consisting of a rectangular central portion surrounded by an annular portion of index lower than the index of the cladding, and then by the cladding, with a zero chromatic dispersion at a wavelength value $\lambda_0$ lying in the range 1380 nm to 1450 nm, and with chromatic dispersion at 1550 nm lying in the range 8 ps/nm·km to 12 ps/nm·km.

In an embodiment, the fiber has zero chromatic dispersion for a wavelength value $\lambda_0$ lying in the range 1400 nm to 1440 nm, and generally and in preferred manner approximately in the range 1400 nm to 1420 nm.

Advantageously, the fiber has an effective area of about 50 μm².

In an embodiment, the fiber has a cutoff wavelength shorter than 1310 nm.

In another embodiment, the fiber has a mode diameter at 1550 nm lying in the range 7.5 μm to 8.5 μm.

In yet another embodiment, the fiber has chromatic dispersion at 1550 nm lying in the range 9 ps/nm·km to 11 ps/nm·km, and generally and in preferred manner in the vicinity of 10 ps/nm·km.

Preferably, the fiber has a chromatic dispersion gradient of less than 0.06 ps/nm²·km at 1550 nm.

Preferably, the fiber has attenuation of less than 0.25 dB/km at 1550 nm.

Advantageously, said rectangular central portion has a refractive index that differs from the index of the cladding by a difference lying in the range $6 \times 10^{-3}$ to $9 \times 10^{-3}$.

Said rectangular central portion preferably extends to a radius lying in the range 2.8 μm to 3.2 μm.

In an embodiment, said annular portion has a refractive index that differs from the index of the cladding by a difference lying in the range $-0.3 \times 10^{-3}$ to $-1.3 \times 10^{-3}$.

Said annular portion advantageously extends to a radius of not less than six times the radius of said central portion.

The invention also provides the use of such a fiber in a wavelength division multiplexed system.

BRIEF DESCRIPTION OF THE DRAWING

Other characteristics and advantages of the invention appear on reading the following description of embodiments of the invention, given by way of example and with reference to the FIGURE which is a diagram showing the index profile of a fiber of the invention.

DETAILED DESCRIPTION OF THE INVENTION

The invention is based on the surprising observation that such a fiber is suitable for WDM transmission systems. It has a dispersion gradient that is shallow in the wavelength range used for wavelength division multiplexed transmission, which range is typically 1530 nm to 1580 nm. In addition, the chromatic dispersion zero around 1400 nm to 1420 nm guarantees that the chromatic dispersion in the wavelength range of the multiplex is sufficient to limit non-linear effects, and in particular to limit four-wave mixing.

The invention thus proposes to use as a line fiber a fiber having an index profile with a rectangular central portion surrounded by an annular portion of index lower than the index of the cladding, and then by cladding, which fiber has chromatic dispersion $dC/d\lambda$ of less than or equal to 0.06 ps/nm$^2$·km in the range of the multiplex, or around 1550 nm. In addition, the chromatic dispersion zero of the fiber in the range 1350 nm to 1450 nm, e.g. around $\lambda_0$=1400 nm or 1420 nm ensures that the fiber has high dispersion in the range of the multiplex. Advantageously, the effective area $A_{eff}$ of the fiber is about 50 $\mu$m$^2$, e.g. in the range 40 $\mu$m$^2$ to 60 $\mu$m$^2$. Preferably, the attenuation is less than 0.25 dB/km at 1550 nm.

The FIGURE is a diagram showing an index profile that can be used to obtained the characteristics of the invention. The index profile shown in the FIGURE is a profile with a rectangular central portion of index higher than the index of the cladding, and, around said central portion, an annular portion of index lower than the index of the cladding. Going from the center of the fiber towards the cladding, the central portion has an index $n_1$ that is substantially constant to a radius $a_1$. In the embodiment of the FIGURE, the difference $\Delta n_1$ between the index $n_1$ and the index $n_c$ of the cladding is equal to 7.5×10$^{-3}$ $\Delta n$, and the radius $a_1$ is equal to 3 $\mu$m. Index values $\Delta n_1$ lying in a range 6×10$^{-3}$ to 9×10$^{-3}$ are suitable; the value of the radius $a_1$ may, without any problem, vary in the range 2.8 $\mu$m to 3.2 $\mu$m.

Around the central portion of index higher than the index of the cladding, the fiber has an annular portion of index lower than the index of the cladding, from radius $a_1$ to radius $a_2$. In the embodiment of the figure, the difference $\Delta n_2$ between the index of the annular portion and the index of the cladding is equal to −0.8×10$^{-3}$ $\Delta n$, and the annular portion extends over a thickness of 15 $\mu$m. More generally, values of $\Delta n_2$ lying in the range −0.3×10$^{-3}$ to −1.3×10$^{-3}$ are suitable, and the outer radius $a_2$ of the annular portion is chosen such that it is equal to at least six times the radius of the central portion of the core, i.e.:

$$a_2/a_1=6$$

Such a profile example makes it possible to obtain attenuation at 1550 nm of less than 0.25 dB/km, a mode diameter $W_{02}$ at 1550 nm of about 8 $\mu$m, and more generally lying in the range 7.5 $\mu$m to 8.5 $\mu$m, and an effective area of about 50 $\mu$m$^2$. In addition, the fiber has a cutoff wavelength $\lambda_c$ that is shorter than 1310 nm. The chromatic dispersion at 1550 nm lies in the range 8 ps/nm·km to 12 ps/nm·km. For the same wavelength value, the chromatic dispersion gradient lies in the approximate range 0.05 ps/nm$^2$·km to 0.06 ps/nm$^2$·km.

Independently of the precise characteristics of the profile of the fiber in the figure, these values are the values that are suitable for a WDM transmission system of the invention.

Fibers of the type shown in FIG. 1 can be manufactured by the person skilled in the art using known techniques such as MCVD or other techniques that are commonly used to manufacture optical fibers.

Naturally, the present invention is not limited to the examples and embodiments described and shown, but rather numerous variants are accessible to the person skilled in the art. It is thus possible, in a transmission system of the invention, to use fibers of the same chromatic dispersion, $\lambda_0$, $\lambda_c$, attenuation and dispersion gradient values as those of the fiber shown in the figure, but that are of profile having the same appearance with numerical index and radius values that are different.

What is claimed is:

1. A dispersion-shifted optical fiber comprising a core and cladding, with an index profile of shape consisting of a rectangular central portion surrounded by an annular portion of index lower than the index of the cladding, and then by the cladding, with a zero chromatic dispersion at a wavelength value $\lambda_0$ lying in the range 1380 nm to 1450 nm, and with chromatic dispersion at 1550 nm lying in the range 8 ps/nm·km to 12 ps/nm·km.

2. A fiber according to claim 1, having zero chromatic dispersion for a wavelength value $\lambda_0$ lying in the range 1400 nm to 1440 nm.

3. A fiber according to claim 1, having an effective area of about 50 $\mu$m$^2$.

4. A fiber according to claim 1, having a cutoff wavelength shorter than 1310 nm.

5. A fiber according to claim 1, having a mode diameter at 1550 nm lying in the range 7.5 $\mu$m to 8.5 $\mu$m.

6. A fiber according to claim 1, having chromatic dispersion at 1550 nm lying in the range 9 ps/nm·km to 11 ps/nm·km.

7. A fiber according to claim 1, having chromatic dispersion of less than 0.06 ps/nm$^2$·km at 1550 nm.

8. A fiber according to claim 1, having attenuation of less than 0.25 dB/km at 1550 nm.

9. A fiber according to claim 1, such that said rectangular central portion has a refractive index that differs from the index of the cladding by a difference lying in the range 6×10$^{-3}$ to 9×10$^{-3}$.

10. A fiber according to claim 1, such that said rectangular central portion extends to a radius lying in the range 2.8 $\mu$m to 3.2 $\mu$m.

11. A fiber according to claim 10, such that said annular portion extends to a radius of not less than six times the radius of said central portion.

12. A fiber according to claim 1, such that said annular portion has a refractive index that differs from the index of the cladding by a difference lying in the range −0.3×10$^{-3}$ to −1.3×10$^{-3}$.

13. The use of the fiber according to claim 1 in a wavelength division multiplexed system.

* * * * *